United States Patent
Caffeau et al.

(10) Patent No.: US 9,889,707 B2
(45) Date of Patent: Feb. 13, 2018

(54) TIRE COMPRISING CABLES FOR REINFORCING THE CARCASS HAVING LOW PERVIOUSNESS, AND TEXTILE THREADS ASSOCIATED WITH THE CARCASS REINFORCEMENT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Charlotte Caffeau, Clermont-Ferrand (FR); Sebastien Noel, Clermont-Ferrand (FR); Bernard Jault, Clermont-Ferrand (FR)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 539 days.

(21) Appl. No.: 14/365,702

(22) PCT Filed: Dec. 18, 2012

(86) PCT No.: PCT/EP2012/075986
§ 371 (c)(1),
(2) Date: Jun. 16, 2014

(87) PCT Pub. No.: WO2013/092609
PCT Pub. Date: Jun. 27, 2013

(65) Prior Publication Data
US 2015/0000816 A1    Jan. 1, 2015

(30) Foreign Application Priority Data
Dec. 19, 2011 (FR) ...................... 11 61888

(51) Int. Cl.
*B60C 9/04* (2006.01)
*B60C 9/20* (2006.01)
(Continued)

(52) U.S. Cl.
CPC .......... *B60C 9/2009* (2013.01); *B60C 9/0007* (2013.01); *B60C 9/0042* (2013.01);
(Continued)

(58) Field of Classification Search
CPC ... B60C 9/0007; B60C 9/0042; B60C 9/2009; B60C 9/04; B60C 9/0238;
(Continued)

(56) References Cited

U.S. PATENT DOCUMENTS 4,363,346 A * 12/1982 Pepe ................... B60C 5/14
139/426 R
2011/0031529 A1   12/2011 Cogne et al.
(Continued)

FOREIGN PATENT DOCUMENTS

DE       102010017444     * 12/2011
FR          2940183 A1      6/2010
(Continued)

OTHER PUBLICATIONS

PCT/EP2012/075986, International Search Report (ISR), Form PCT/ISA/210, dated Feb. 18, 2013 (including English translation), 5 pgs.

*Primary Examiner* — Robert Dye
(74) *Attorney, Agent, or Firm* — Dickinson Wright, PLLC

(57) ABSTRACT

A tire having a radial carcass reinforcement, composed of at least one layer of metal reinforcing elements, the said tire comprising a crown reinforcement, itself topped radially by a tread, the said tread being joined to two beads via two sidewalls. The metal reinforcing elements of at least one layer of the carcass reinforcement are cords exhibiting, in
(Continued)

the "permeability" test, a flow rate of less than 20 cm³/min and at least one layer of the carcass reinforcement is provided, on at least one face, with textile threads exhibiting, in the "permeability" test, a flow rate of between 1 and 3 cm³/min.

22 Claims, 3 Drawing Sheets

(51) Int. Cl.
  *B60C 9/08* (2006.01)
  *B60C 9/00* (2006.01)
  *B60C 9/09* (2006.01)
  *B60C 9/02* (2006.01)
  *D07B 1/06* (2006.01)
  *B60C 19/00* (2006.01)
(52) U.S. Cl.
  CPC ............... *B60C 9/08* (2013.01); *B60C 9/09* (2013.01); *D07B 1/062* (2013.01); *B60C 9/0238* (2013.01); *B60C 2009/0416* (2013.01); *B60C 2009/0491* (2013.01); *B60C 2009/2012* (2013.01); *B60C 2009/2016* (2013.01); *B60C 2009/2077* (2013.01); *B60C 2019/008* (2013.01); *D07B 1/0626* (2013.01); *D07B 1/0633* (2013.01); *D07B 2201/2046* (2013.01); *D07B 2201/2081* (2013.01); *Y10T 152/10873* (2015.01)

(58) Field of Classification Search
  CPC .... B60C 2009/0491; B60C 2009/0416; B60C 2009/0475; Y10T 152/10873
  USPC .......................................................... 152/557
  See application file for complete search history.

(56) References Cited

U.S. PATENT DOCUMENTS

| | | |
|---|---|---|
| 2012/0000590 A1 | 1/2012 | Cogne et al. |
| 2013/0056128 A1* | 3/2013 | Kanz ....................... B60C 19/08 |
| | | 152/548 |
| 2013/0174951 A1* | 7/2013 | Schunack .............. D06M 11/74 |
| | | 152/152.1 |

FOREIGN PATENT DOCUMENTS

| | | |
|---|---|---|
| FR | 2940184 A1 | 6/2010 |
| JP | 02-299903 | * 12/1990 |

* cited by examiner

TIRE COMPRISING CABLES FOR REINFORCING THE CARCASS HAVING LOW PERVIOUSNESS, AND TEXTILE THREADS ASSOCIATED WITH THE CARCASS REINFORCEMENT

This application is a 371 national phase entry of PCT/EP2012/075986, filed 18 Dec. 2012, which claims benefit of FR 1161888, filed 19 Dec. 2011, the entire contents of which are incorporated herein by reference for all purposes.

BACKGROUND

1. Field

The present disclosure relates to a tire having a radial carcass reinforcement and more particularly to a tire intended to equip vehicles carrying heavy loads and running at sustained speed, such as, for example, lorries, tractors, trailers or buses.

2. Description of Related Art

Generally, in tires of heavy-duty type, the carcass reinforcement is anchored on either side in the region of the bead and is surmounted radially by a crown reinforcement composed of at least two superimposed layers formed of threads or cords which are parallel in each layer and crossed from one layer to the next, forming angles of between 10° and 45° with the circumferential direction. The said working layers, forming the working reinforcement, can also be covered with at least one "protective" layer formed of reinforcing elements which are advantageously metallic and extensible, referred to as elastic. It can also comprise a layer of metal threads or cords having a low extensibility forming, with the circumferential direction, an angle of between 45° and 90°, this "triangulation" ply being radially located between the carcass reinforcement and the first "working" crown ply, which are formed of parallel threads or cords exhibiting angles at most equal to 45° in absolute value. The triangulation ply forms, with at least the said working ply, a triangulated reinforcement which exhibits, under the various stresses to which it is subjected, few deformations, the triangulation ply having the essential role of absorbing the transverse compressive loads to which all the reinforcing elements in the region of the crown of the tire are subjected.

In the case of tires for "heavy-duty" vehicles, just one protective layer is usually present and its protective elements are, in the majority of cases, oriented in the same direction and with the same angle in absolute value as those of the reinforcing elements of the radially outermost and thus radially adjacent working layer. In the case of construction plant tires intended for running on more or less undulating ground, the presence of two protective layers is advantageous, the reinforcing elements being crossed from one layer to the following layer and the reinforcing elements of the radially internal protective layer being crossed with the inextensible reinforcing elements of the radially external working layer adjacent to the said radially internal protective layer.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction which intersects the axis of rotation of the tire and is perpendicular thereto.

The axis of rotation of the tire is the axis around which it revolves in normal use.

A radial or meridian plane is a plane which contains the axis of rotation of the tire.

The circumferential median plane, or equatorial plane, is a plane perpendicular to the axis of rotation of the tire and which divides the tire into two halves.

Some current tires, referred to as "road" tires, are intended to run at high speed and over increasingly long journeys, as a result of the improvement in the road network and of the growth of the motorway network throughout the world. The combined conditions under which such a tire is called upon to run without any doubt makes possible an increase in the number of miles travelled, the wear on the tire being reduced; on the other hand, the endurance of the tire is detrimentally affected. In order to allow one, indeed even two, retreadings of such tires in order to lengthen their lifetime, it is necessary to retain a structure and in particular a carcass reinforcement having endurance properties sufficient to withstand the said retreadings.

Prolonged running under particularly severe conditions of the tires thus constructed effectively results in limits in terms of endurance of these tires.

The elements of the carcass reinforcement are in particular subjected to bending and compressive stresses during running which adversely affect their endurance. Specifically, the cords which form the reinforcing elements of the carcass layers are subjected to high stresses during the running of the tires, in particular to repeated bending actions or variations in curvature, resulting in rubbing actions at the threads and thus in wear, and also in fatigue; this phenomenon is described as "fatigue-fretting".

In order to perform their role of strengthening the carcass reinforcement of the tire, the said cords first of all have to exhibit good flexibility and a high flexural endurance, which implies in particular that their threads exhibit a relatively small diameter, preferably of less than 0.28 mm, more preferably of less than 0.25 mm, generally smaller than that of the threads used in conventional cords for the crown reinforcements of tires.

The cords of the carcass reinforcement are also subject to "fatigue-corrosion" phenomena due to the very nature of the cords, which favor the passage, indeed even drain, corrosive agents, such as oxygen and moisture. This is because the air or the water which penetrate into the tire, for example when damaged by a cut or more simply as the result of the permeability, even low, of the internal surface of the tire, can be conveyed by the channels formed within the cords from the very fact of their structure.

All these fatigue phenomena, which are grouped together generally under the generic term of "fatigue-fretting-corrosion", are the cause of a progressive deterioration in the mechanical properties of the cords and can affect, for the most severe running conditions, the lifetime of the cords.

In order to improve the endurance of these cords of the carcass reinforcement, it is known in particular to increase the thickness of the rubber layer which forms the internal wall of the cavity of the tire in order to limit as much as possible the permeability of the said layer. This layer is usually partly composed of butyl, so as to increase the leaktightness of the tire. This type of material exhibits the disadvantage of increasing the cost of the tire.

It is also known to modify the construction of the said cords in order in particular to increase their penetrability by the rubber and thus to limit, indeed even eliminate, the passage of oxidizing agents via the channels formed within the cords. Tires thus produced have demonstrated problems of appearance of air pockets during the manufacture of the to tire.

This is because the various stages of manufacture result in the formation of occluded air pockets. In the case of tires comprising a carcass reinforcement formed of cords, the structure of which forms channels which can convey air, these air pockets disappear as a result of the diffusion of the air into the materials, in particular through the said channels existing within the cords. In the case of tires comprising a carcass reinforcement formed of cords, the structure of which is strongly penetrated by the rubber, these air pockets remain on conclusion of the manufacturing stages. There appears solely a displacement of these air pockets during the stage of curing the tire, the pockets being displaced towards regions where a low pressure is exerted. This displacement of the air takes place along the carcass reinforcement following passages existing between the reinforcing elements, the layers of rubber mixture covering the reinforcing elements forming reinforcing regions parallel to the reinforcing elements before the stage of curing the tire. These reinforcing regions thus allow the air to be slightly displaced as a function of the pressure which is exerted on the regions where the air pockets occur. The pressure or the variations in pressure occur in particular during the stage of curing the tire or else during the shaping stage, if this exists.

The appearance of these air pockets is generally totally unacceptable according to their location and can require the scrapping of the tires, it being possible for the air pockets to become regions of weakness of the tire. The manufacturing costs then become unacceptable due to the simple fact of the low production outputs.

Furthermore, solutions consisting in deploying associated textile threads on at least one layer of the carcass reinforcement have already been provided. Such threads can make it possible to drain the air occluded during the manufacture of the tire and thus results in a greater productivity than that mentioned above and thus in more advantageous manufacturing costs. Such solutions are, for example, described in Patent Applications WO10/072,463 and WO10/072,464.

However, it turns out that, under particularly severe running conditions, in particular in terms of load and temperature, tires thus produced exhibit a reduced performance in terms of endurance in comparison with that of tires not comprising such associated textile threads on at least one layer of the carcass reinforcement.

SUMMARY

The inventors thus set themselves the task of providing tires for heavy vehicles of "heavy-duty" type, the wear performance of which is retained for road uses and the performance, in particular endurance performance, of which is improved, in particular from the viewpoint of the fatigue-corrosion or fatigue-fretting-corrosion phenomena, whatever the running conditions, and for which the manufacturing cost remains acceptable.

This aim was achieved according to embodiments of the invention by a tire having a radial carcass reinforcement, composed of at least one layer of metal reinforcing elements, the said tire comprising a crown reinforcement, itself topped radially by a tread, the said tread being joined to two beads via two sidewalls, the metal reinforcing elements of at least one layer of the carcass reinforcement being cords, advantageously non-wrapped cords, exhibiting, in the "permeability" test, a flow rate of less than 20 cm$^3$/min, at least one layer of the carcass reinforcement being provided, on at least one face, with textile threads exhibiting, in the "permeability" test, a flow rate of between 1 and 3 cm$^3$/min.

According to a preferred embodiment of the invention, the textile threads exhibit a diameter of between 0.2 and 0.35 mm.

The measurement of the diameter of the textile threads is carried out on a laser micrometer sold under the name Laser Z-Mike, series 1200. The measurement is carried out with a pretension applied to the thread and calculated on the basis of 0.5 cN/Tex.

The textile threads are advantageously threads which confer no or virtually no mechanical property on the tire, such as cotton threads. The textile threads advantageously exhibit air-draining properties. In addition, the increase in the overall weight of the tire as a result of the presence of these textile threads is entirely negligible.

Advantageously again, the main directions of the textile threads are parallel to one another.

The textile threads are advantageously deployed on the axially outer surface in the sidewalls of the carcass reinforcement. In the case of a tire comprising bead wires around which the carcass reinforcement forms a turn-up, the textile threads are advantageously deployed on the surface which comes into contact with the bead wire. This positioning is particularly advantageous in ensuring complete discharge of the air pockets which are formed during the manufacture of the tire, these appearing essentially on the axially and/or radially outer surface of the carcass reinforcement during the manufacture.

Textile threads can also be deployed on both faces of a carcass reinforcement layer.

In the case of a carcass reinforcement comprising several layers of reinforcing elements, each of the said layers can comprise textile threads on at least one face.

The "permeability" test makes it possible to determine the longitudinal permeability to air of the cords tested, by measuring the volume of air passing along a test specimen under constant pressure during a given period of time. The principle of such a test, which is well known to a person skilled in the art, is to demonstrate the effectiveness of the treatment of a cord in order to render it impermeable to air; it has been described, for example, in Standard ASTM D2692-98.

In the case of the textile threads, the same measurement will make it possible to evaluate the ability of the said textile threads to discharge the air before they are penetrated by the rubber mixtures during the curing of the tire.

As regards the cords, the test is carried out on cords extracted directly, by stripping, from the vulcanized rubber plies which they reinforce, thus penetrated by the cured rubber The test is carried out on a 2 cm length of cord, thus coated with its surrounding rubber composition (or coating rubber) in the cured state, in the following way: air is sent to the inlet of the cord, under a pressure of 1 bar, and the volume of air at the outlet is measured using a flow meter (calibrated, for example, from 0 to 500 cm$^3$/min). During the measurement, the sample of cord is immobilized in a compressed leaktight seal (for example a seal made of dense foam or of rubber) so that only the amount of air passing along the cord from one end to the other, along its longitudinal axis, is taken into account by the measurement; the leaktightness of the leaktight seal itself is monitored beforehand using a solid rubber test specimen, that is to say one devoid of cord.

The lower the mean air flow rate measured (mean over 10 test specimens), the higher the longitudinal impermeability of the cord. As the measurement is carried out with an accuracy of ±0.2 cm$^3$/min, measured values of less than or equal to 0.2 cm³/min are regarded as zeros; they correspond to a cord which can be described as airtight (completely airtight) along its axis (i.e., in its longitudinal direction).

As regards the textile threads, the test is carried out on threads which have not been impregnated with vulcanized rubber.

The test is carried out on a test specimen of raw rubber mixture in which a textile thread is placed. The test specimen is produced by a stack of two layers of rubber mixture having dimensions of 6×12 mm and a thickness of 3 mm, between which the thread is deposited with a pretension of less than 0.5 N in order to ensure that it is straight. A pressure is exerted in order to ensure a leaktight seal of the two layers of rubber mixture. The test specimen thus forms a parallelepiped having dimensions of 6×6×12 mm. The thread is severed at the faces of the test specimen.

The measurement is subsequently similar to that carried out on the cords and described above. The zero is established by a measurement on a test specimen not comprising thread.

As regards the cords, this permeability test constitutes a simple means of indirect measurement of the degree of penetration of the cord by a rubber composition. The lower the flow rate measured, the greater the degree of penetration of the cord by the rubber.

The degree of penetration of a cord can also be estimated according to the method described below. In the case of a layered cord, the method consists, in a first step, in removing the outer layer over a sample with a length of between 2 and 4 cm in order to subsequently measure, along a longitudinal direction and along a given axis, the sum of the lengths of rubber mixture with respect to the length of the sample. These measurements of lengths of rubber mixture exclude the spaces not penetrated along this longitudinal axis. These measurements are repeated along three longitudinal axes distributed over the periphery of the sample and are repeated on five samples of cords.

When the cord comprises several layers, the first stage of removal is repeated with the newly outer layer and the measurements of lengths of rubber mixture along longitudinal axes.

A mean of all the ratios of lengths of rubber mixture to the lengths of the samples thus determined is subsequently produced in order to define the degree of penetration of the cord.

The inventors have been able to demonstrate that a tire thus produced according to embodiments of the invention results in highly advantageous improvements in terms of compromise between endurance and manufacturing costs. This is because the cords of the carcass reinforcement exhibiting, in the "permeability" test, a flow rate of less than 20 cm³/min make it possible to limit the risks related to corrosion. In addition, the presence of the textile threads exhibiting, in the "permeability" test, a flow rate of between 1 and 3 cm³/min associated with at least one layer of the carcass reinforcement makes it possible to drain the air occluded during the manufacture of the tire and thus results in a greater productivity than that mentioned above and thus in more advantageous costs.

The inventors have also been able to demonstrate that the presence of the textile threads exhibiting, in the "permeability" test, a flow rate of greater than 1 cm³/min is necessary in order to ensure the draining of the air occluded during the manufacture of the tire. On the other hand, textile threads exhibiting, in the "permeability" test, a flow rate of greater than 3 cm³/min must not be used at the risk of harming the endurance of the tire. This is because it is apparent that textile threads exhibiting, in the "permeability" test, a flow rate of greater than 3 cm³/min can result in appearance of cracking of the rubber mixtures under certain running conditions. The inventors interpret this improvement in the endurance of the tire, whatever the running conditions, by an inability of the textile threads exhibiting, in the "permeability" test, a flow rate of less than 3 cm³/min to create pockets of air and/or of moisture which can become localized in regions promoting the oxidation of the mixtures, in particular as a result of the excessive strains experienced by the tire under particularly severe running conditions.

According to a first embodiment of the invention, the textile threads exhibiting, in the "permeability" test, a flow rate of between 1 and 3 cm³/min are parallel to one another and oriented along a direction parallel to that of the metal reinforcing elements of the said at least one layer of the carcass reinforcement.

Preferably again according to this first embodiment of the invention, the ratio of the spacing between two textile threads to the spacing between the reinforcing elements of the said at least one layer of the carcass reinforcement is greater than 10.

The spacing between two textile threads is measured along a direction perpendicular to the direction of the said textile threads. The spacing between the reinforcing elements of the said at least one layer of the carcass reinforcement is measured along a direction perpendicular to the direction of the said reinforcing elements of the said at least one layer of the carcass reinforcement.

According to a second embodiment of the invention, the textile threads exhibiting, in the "permeability" test, a flow rate of between 1 and 3 cm³/min are oriented mainly along a direction parallel to that of the metal reinforcing elements of the said at least one layer of the carcass reinforcement and are undulating around this main direction.

The inventors have been able to demonstrate that the undulation of the textile threads can make it possible to optimize, in particular with respect to straight threads, the probability for the occluded air of encountering a "drain", either from the formation of an air pocket or during a displacement of the said air pocket along a direction parallel to the reinforcing elements of the carcass reinforcement layer during the stages of manufacture of the tire, as was touched on above.

Advantageously according to this second embodiment of the invention, the undulations of the textile threads are in phase with one another.

According to this second embodiment of the invention, the ratio of the spacing between two textile threads to the amplitude of undulation is advantageously between 0.5 and 1. Such a ratio makes it possible to optimize the region occupied by the textile threads on the carcass reinforcement layer along the direction perpendicular to the main direction of positioning of the said threads and thus perpendicular to the direction of the reinforcing elements of the carcass reinforcement layer. Such an occupation of the said region makes it possible to ensure the draining of the air over the whole of the surface of the carcass reinforcement layer.

The spacing between two textile threads is measured along a direction perpendicular to the main direction of the said textile threads and thus perpendicular to the direction of the reinforcing elements of the said at least one layer of the carcass reinforcement.

Preferably again according to this second embodiment of the invention, the ratio of the spacing between two textile threads to the spacing between the reinforcing elements of the said at least one layer of the carcass reinforcement is greater than 10. Just as above, the increase in the number of textile threads with respect to the number of reinforcing elements of the carcass reinforcement layer makes it possible to ensure better drainage for a moderate cost. As the positioning of the textile threads has a cost, the number of threads positioned has to remain limited.

Preferably again, the ratio of the period of undulation to the amplitude of undulation is between 5 and 20. Such a ratio results in an undulation of the textile threads which will in particular make it possible to prevent the risks of breakage of the textile threads during the various phases of manufacture of the tire as a result of the stresses applied. The value of 20 guarantees satisfactory drainage, it being possible for excessively great periods to result in a risk of not exhibiting a drain (textile thread) in a region where the occluded air is present or even is moving.

Advantageously again, the spacing between the textile threads is constant and the amplitude and the period of undulation are constant.

According to a third embodiment of the invention, the textile threads exhibiting, in the "permeability" test, a flow rate of between 1 and 3 $cm^3$/min are oriented mainly along a straight direction and the said textile threads form an angle with the direction of the metal reinforcing elements of the said at least one layer of the carcass reinforcement which is greater than 10° and preferably greater than 25°.

According to this third embodiment of the invention, the angle formed by the said textile threads with the direction of the metal reinforcing elements of the said at least one layer of the carcass reinforcement is advantageously greater than 45° and more preferably greater than 65°. Angles lower than these values require a greater number of textile threads in order to ensure optimum discharge of the occluded air pockets. This is because angles greater than these values are more suitable with a lower number of threads and thus a greater spacing of the threads in order to ensure optimum discharge of the occluded air pockets. The optimum in terms of number of threads corresponds to an angle formed by the said textile threads with the direction of the metal reinforcing elements of the said at least one layer of the carcass reinforcement equal to 90°. However, manufacturing constraints can impose lower angles in order to ensure satisfactory productivity, on considering that the textile threads are advantageously deployed during the manufacture of the carcass reinforcement layer. On a case by case basis, a person skilled in the art will determine the best compromise between the number of textile threads necessary and the angle for positioning the latter.

Preferably again, the ratio of the spacing between two textile threads according to this third embodiment of the invention, measured along a direction parallel to the direction of the reinforcing elements of the said at least one layer of the carcass reinforcement, to the spacing between the reinforcing elements of the said at least one layer of the carcass reinforcement is greater than 10. Just as mentioned above, the increase in the number of textile threads with respect to the number of reinforcing elements of the carcass reinforcement layer makes it possible to ensure better drainage for a moderate cost. As the positioning of the textile threads has a cost, the number of threads positioned has, however, to remain limited.

Preferably again according to this third embodiment of the invention, at least one layer of the carcass reinforcement is provided, on at least one face, with at least two layers of textile threads having a straight orientation, the said textile threads being crossed from one layer to the following layer. Such an arrangement of textile threads can allow more certain drainage of the occluded air pockets for a given number of threads and thus with arrangements of threads exhibiting greater spacings between the threads.

The inventors have also been able to demonstrate that the effectiveness of the textile threads in discharging the air occluded during the manufacture of the tire lies in particular in the fact that these threads are positioned bare, that is to say not coated with a polymer mixture, such as rubber, and that they can thus capture the air and/or the moisture over their entire length in order subsequently to drain it or them. This is because threads or else textile fabrics coated with rubber or else a rubber ply comprising textile threads or a textile fabric would be completely devoid of the same effect, only the ends of the textile threads being able to be in contact with the occluded air pockets. The presence of an air pocket over a region of a textile thread coated with rubber might not be drained. In order not to retain occluded air pockets after the manufacture of the tire, the draining of these air pockets has to be able to be carried out very rapidly, in particular during the vulcanization stage. Rubber-coated textile threads cannot ensure such a function, the presence of a polymer material slowing down the diffusion of the air and/or of the moisture.

In contrast, after vulcanization, the textile threads according to the invention are then embedded in the rubber body of the tire. They retain an effectiveness for the draining of traces of air and/or moisture which can originate, for example, from accidental surface damage to the tire or else from the pressurized air within the cavity. The amounts to be drained are then much smaller and the draining is carried out over much longer periods of time, these traces of air and/or moisture appearing slowly by phenomena of diffusion through the rubber bodies.

According to an advantageous alternative form of the invention, the metal reinforcing elements of at least one layer of the carcass reinforcement are cords comprising at least two layers, at least one inner layer being sheathed with a layer consisting of a polymer composition, such as a non-crosslinkable, crosslinkable or crosslinked rubber composition, preferably based on at least one diene elastomer.

According to a preferred embodiment of the invention, the cords of the carcass reinforcement exhibit, in the "permeability" test, a flow rate of less than 10 $cm^3$/min and more preferably of less than 2 $cm^3$/min.

The invention also provides, in an embodiment, a tire having a radial carcass reinforcement, composed of at least one layer of reinforcing elements, the said tire comprising a crown reinforcement, itself topped radially by a tread, the said tread being joined to two beads via two sidewalls, the metal reinforcing elements of at least one layer of the carcass reinforcement being cords, advantageously non-wrapped cords, comprising at least two layers, at least one inner layer being sheathed with a layer consisting of a polymeric composition, such as a non-crosslinkable, crosslinkable or crosslinked rubber composition, preferably based on at least one diene elastomer, and at least one layer of the carcass reinforcement being provided, on at least one face, with textile threads exhibiting, in the "permeability" test, a flow rate of between 1 and 3 $cm^3$/min.

Within the meaning of embodiments of the invention, cords, comprising at least two layers, at least one inner layer being sheathed with a layer consisting of a polymer composition, exhibit, in the "permeability" test, a flow rate of less than 20 $cm^3$/min and advantageously of less than 2 $cm^3$/min.

The expression "composition based on at least one diene elastomer" is understood to mean, in a known way, that the composition predominantly comprises (i.e., according to a fraction by weight of greater than 50%) this or these diene elastomers.

It should be noted that the sheath according to invention extends continuously around the layer which it covers (that is to say that this sheath is continuous in the "orthoradial" direction of the cord, which is perpendicular to its radius), so as to form a continuous sleeve having a transverse cross section which is advantageously virtually circular.

It should also be noted that the rubber composition of this sheath can be crosslinkable or crosslinked, that is to say that it comprises, by definition, a suitable crosslinking system for making possible the crosslinking of the composition during the curing thereof (i.e., the curing thereof and not the melting thereof); thus, this rubber composition can be described as infusible, owing to the fact that it cannot be melted by heating at any temperature whatever.

A "diene" elastomer or rubber is understood, in a known way, to mean an elastomer resulting at least in part (i.e., a homopolymer or a copolymer) from diene monomers (monomers bearing two conjugated or non-conjugated carbon-carbon double bonds).

Preferably, the system for crosslinking the rubber sheath is a "vulcanization" system, that is to say a system based on sulphur (or on a sulphur-donating agent) and on a primary vulcanization accelerator. Additional to this base vulcanization system may be various known secondary vulcanization accelerators or vulcanization activators.

The rubber composition of the sheath according to the invention can comprise, in addition to the said crosslinking system, all the normal ingredients which can be used in rubber compositions for tires, such as reinforcing fillers based on carbon black and/or on a reinforcing inorganic filler, such as silica, anti-ageing agents, for example antioxidants, extending oils, plasticizers or agents which promote the processing of compositions in the raw state, methylene acceptors and donors, resins, bismaleimides, known adhesion-promoting systems of the "RFS" (resorcinol/formaldehyde/silica) type or metal salts, in particular cobalt salts.

Preferably, the composition of this sheath is chosen to be identical to the composition used for the rubber matrix which the cords according to the invention are intended to reinforce. Thus, there is no problem of possible incompatibility between the respective materials of the sheath and of the rubber matrix.

According to an alternative form of the invention, the metal reinforcing elements of at least one layer of the carcass reinforcement are layered metal cords of [L+M] or [L+M+N] construction which can be used as reinforcing element of a tire carcass reinforcement, comprising a first layer C1 having L threads of diameter $d_1$ with L ranging from 1 to 4, surrounded by at least one intermediate layer C2 having M threads of diameter $d_2$ wound together in a helix according to a pitch $p_2$ with M ranging from 3 to 12, the said layer C2 optionally being surrounded by an outer layer C3 of N threads of diameter $d_3$ wound together in a helix according to a pitch $p_3$ with N ranging from 8 to 20, a sheath composed of a non-crosslinkable, crosslinkable or crosslinked rubber composition based on at least one diene elastomer covering, in the construction [L+M], the said first layer C1 and, in the construction [L+M+N], at least the said layer C2.

Preferably, the diameter of the threads of the first layer of the inner layer (C1) is between 0.10 and 0.5 mm and the diameter of the threads of the outer layers (C2, C3) is between 0.10 and 0.5 mm.

More preferably, the winding helix pitch of the said threads of the outer layer (C3) is between 8 and 25 mm.

Within the meaning of embodiments of the invention, the helix pitch represents the length, measured parallel to the axis of the cord, at the end of which a thread having this pitch makes one complete turn around the axis of the cord; thus, if the axis is sectioned by two planes perpendicular to the said axis and separated by a length equal to the pitch of a thread of a constituent layer of the cord, the axis of this thread has, in both these planes, the same position on the two circles corresponding to the layer of the thread under consideration.

Advantageously, the cord exhibits one and more preferably still all of the following characteristics, which is confirmed:

the layer C3 is a saturated layer, that is to say that there does not exist sufficient space in this layer to add thereto at least one (N+1)th thread of diameter $d_3$, N then representing the maximum number of threads which can be wound as a layer around the layer C2;

the rubber sheath in addition covers the inner layer C1 and/or separates the paired adjacent threads of the intermediate layer C2;

the rubber sheath covers virtually the radially inner half-circumference of each thread of the layer C3, so that it separates the adjacent paired threads of this layer C3.

Preferably, the rubber sheath exhibits a mean thickness ranging from 0.010 mm to 0.040 mm.

Generally, embodiments of the invention can be employed, to form the cords of the carcass reinforcement which are described above, with metal threads of any type, in particular made of steel, for example threads made of carbon steel and/or threads made of stainless steel. Use is preferably made of carbon steel but it is, of course, possible to use other steels or other alloys.

When a carbon steel is used, its carbon content (% by weight of steel) is preferably between 0.1% and 1.2%, more preferably between 0.4% and 1.0%; these contents represent a good compromise between the mechanical properties required for the tire and the feasibility of the thread. It should be noted that a carbon content of between 0.5% and 0.6% renders such steels finally less expensive as they are easier to draw. Another advantageous embodiment of the invention can also consist, depending on the applications targeted, in using steels having a low carbon content, for example of between 0.2% and 0.5%, due in particular to a lower cost and to a greater ease of drawing.

The cord according to an embodiment of the invention can be obtained according to various techniques known to a person skilled in the art, for example in two stages, first of all by sheathing the core or intermediate structure L+M (layers C1+C2) via an extrusion head, which stage is followed, in a second step, by a final operation in which the remaining threads N (layer C3) are cabled or twisted around the layer C2 thus sheathed. The problem of bonding in the raw state posed by the rubber sheath during the optional intermediate winding and unwinding operations can be solved in a way known to a person skilled in the art, for example by the use of an interposed plastic film.

Such cords of at least one working crown layer are, for example, chosen from the cords described in Patent Applications WO 2005/071157, WO 2010/012411, WO 2010/054790 and WO 2010/054791.

According to an alternative embodiment of the invention, the crown reinforcement of the tire is formed of at least two working crown layers of inextensible reinforcing elements, crossed from one layer to the other, forming, with the circumferential direction, angles of between 10° and 45°.

According to other alternative embodiments of the invention, the crown reinforcement also comprises at least one layer of circumferential reinforcing elements.

A preferred embodiment of the invention also provides for the crown reinforcement to be supplemented radially on the outside by at least one additional layer, known as protective layer, of "elastic" reinforcing elements, which are oriented, with respect to the circumferential direction, with an angle of between 10° and 45° and in the same direction as the angle formed by the inextensible elements of the working layer radially adjacent to it.

The protective layer can have an axial width smaller than the axial width of the narrowest working layer. The said protective layer can also have an axial width greater than the axial width of the narrowest working layer, such that it overlaps the edges of the narrowest working layer and, when it is the layer radially above which is narrowest, such that it is coupled, in the axial extension of the additional reinforcement, with the widest working crown layer over an axial width in order thereafter, axially on the outside, to be decoupled from the said widest working layer by profiled elements having a thickness at least equal to 2 mm. The protective layer formed of elastic reinforcing elements can, in the abovementioned case, on the one hand be optionally decoupled from the edges of the said narrowest working layer by profiled elements having a thickness substantially less than the thickness of the profiled elements separating the edges of the two working layers and, on the other hand, have an axial width less than or greater than the axial width of the widest crown layer.

According to any one of the embodiments of the invention mentioned above, the crown reinforcement can also be supplemented, radially on the inside between the carcass reinforcement and the radially inner working layer closest to the said carcass reinforcement, by a triangulation layer of inextensible metal reinforcing elements made of steel forming, with the circumferential direction, an angle greater than 60° and in the same direction as that of the angle formed by the reinforcing elements of the layer radially closest to the carcass reinforcement.

BRIEF DESCRIPTION OF DRAWINGS

Other advantageous details and characteristics of embodiments of the invention will emerge below from the description of the exemplary embodiments of the invention, with reference to FIGS. 1 to 7, which represent.

The figures are not represented to scale in order to make them easier to understand.

DETAILED DESCRIPTION OF SPECIFIC EMBODIMENTS

Figure 1:
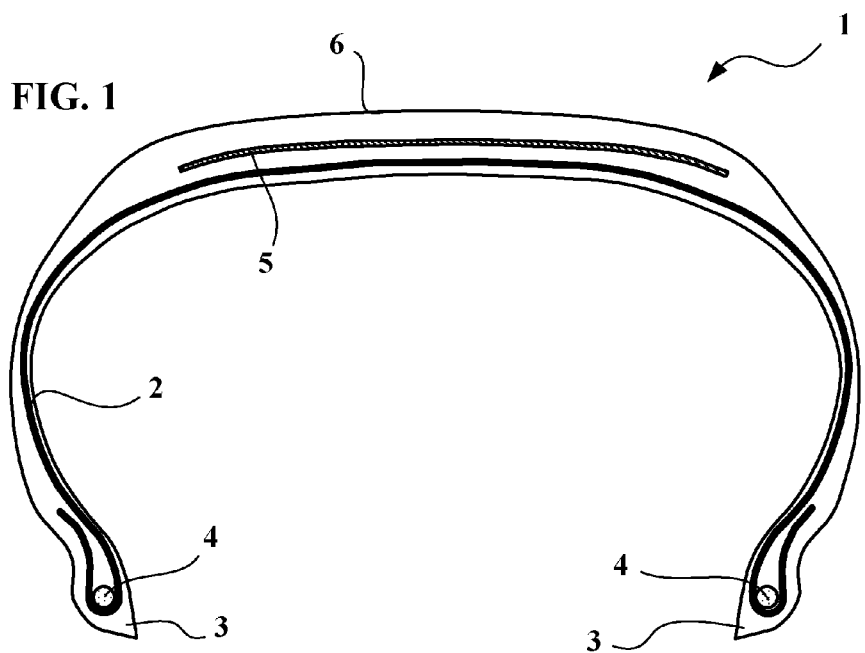
FIG. 1, a meridional view of a diagram of a tire according to an embodiment of the invention, FIG. 2, a half-cutaway diagrammatic representation of a carcass reinforcement layer of the tire of FIG. 1 according to a first embodiment of the invention, FIG. 3, a half-cutaway diagrammatic representation of a carcass reinforcement layer of the tire of FIG. 1 according to a second embodiment of the invention, FIG. 4, a half-cutaway diagrammatic representation of a carcass reinforcement layer of the tire of FIG. 1 according to a third embodiment of the invention, FIG. 5, a diagrammatic representation of a cross-sectional view of a carcass reinforcement cord of the tire of FIG. 1, FIG. 6, a diagrammatic representation of a cross-sectional view of a first other example of a carcass reinforcement cord according to the invention, FIG. 7, a diagrammatic representation of a cross-sectional view of a second other example of a carcass reinforcement cord according to the invention.

In FIG. 1, the tire 1, of size 315/70 R 22.5, comprises a radial carcass reinforcement 2 anchored in two beads 3 around bead wires 4. The carcass reinforcement 2 is formed of a single layer of metal cords. The carcass reinforcement 2 is wrapped by a crown reinforcement 5, itself topped by a tread 6. The crown reinforcement 5 is formed radially, from the inside towards the outside:

of a first working layer formed of non-wrapped inextensible metal cords 11.35 which are continuous over the entire width of the ply and which are oriented with an angle equal to 18°, of a second working layer formed of non-wrapped inextensible metal cords 11.35 which are continuous over the entire width of the ply, which are oriented with an angle equal to 18° and which are crossed with the metal cords of the first working layer, of a protective layer formed of elastic metal cords 6×35.

These combined layers, constituting the crown reinforcement 5, are not represented in detail in the figures.

Figure 2:
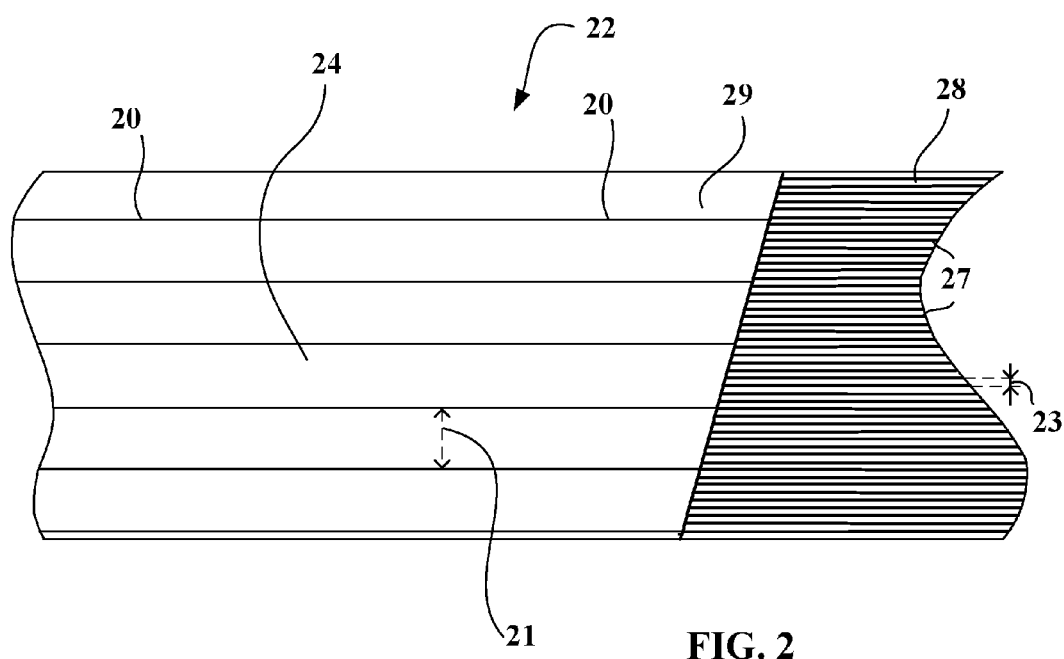

FIG. 2 illustrates a half-cutaway representation of a carcass reinforcement layer 22 according to a first embodiment of the invention. This layer is composed of metal cords 27 oriented parallel with respect to one another and held between two layers 28, 29 of rubber mixture, referred to as calendaring layers. Cotton threads 20 are deployed on the "outer" surface (surface which is not in contact with the metal cords) of the calendaring layer 29, which cotton threads are parallel to one another and parallel to the metal cords 27.

In accordance with an embodiment of the invention, the ratio of the spacing 21 between two cotton threads 20 to the spacing 23 between the metal cords 27 of the layer of the carcass reinforcement 22 is equal to 16 and thus greater than 10.

The cotton threads 20 are deployed on the surface of the carcass reinforcement layer 22 which comes into contact with the bead wire 4.

Figure 3:
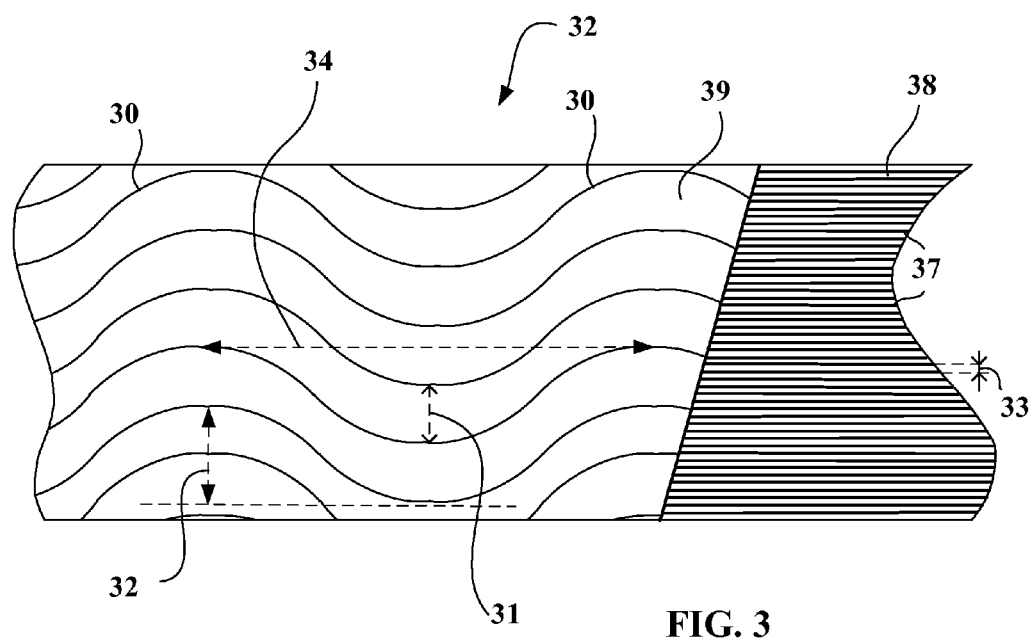

FIG. 3 illustrates a half-cutaway representation of a carcass reinforcement layer 32 according to a second embodiment of the invention. As in the case of FIG. 2, this layer is composed of metal cords 37 oriented parallel with respect to one another and held between two layers 38, 39 of rubber mixture, referred to as calendaring layers. Cotton threads 30 are deployed on the "outer" surface (surface which is not in contact with the metal cords) of the calendaring layer 39, which cotton threads exhibit an undulation around a main or mean axis oriented parallel to the direction of the metal cords 37. In accordance with the invention, the ratio of the spacing 31 between two cotton threads 30 to the amplitude of undulation 32 is equal to 0.63 and thus between 0.5 and 1.

The ratio of the spacing 31 between two cotton threads 30 to the spacing 33 between the metal cords 37 of the layer of the carcass reinforcement 32 is equal to 11 and thus greater than 10.

The ratio of the period of undulation 34 to the amplitude of undulation 32 of the cotton threads 30 is equal to 5.4 and thus between 5 and 20.

As in the case of FIG. 2, the cotton threads 30 are deployed on the surface of the carcass reinforcement layer 32 which comes into contact with the bead wire 4.

Figure 4:
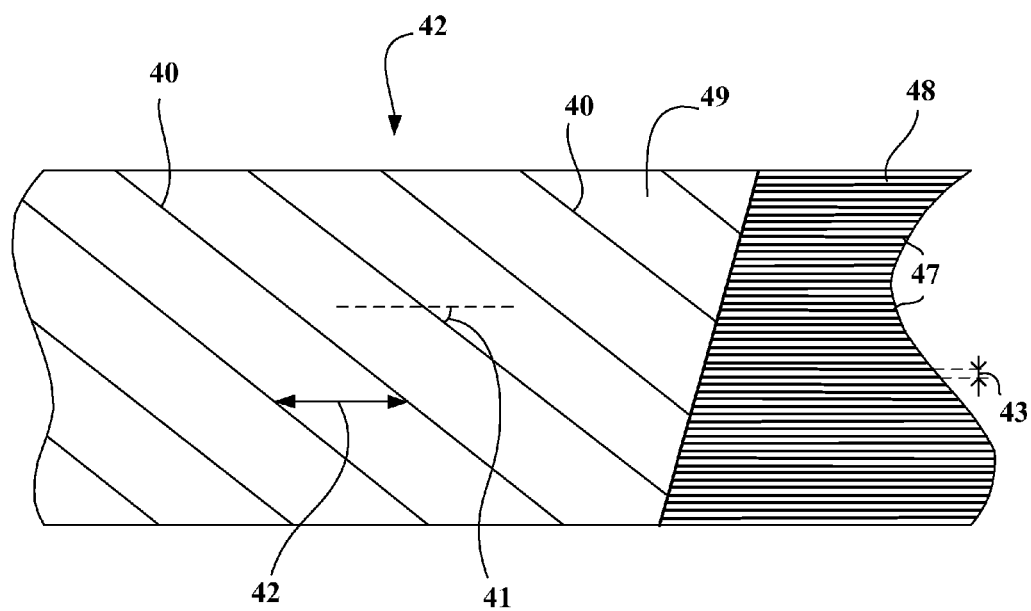

FIG. 4 illustrates a half-cutaway representation of a carcass reinforcement layer 42 according to the invention. This layer is composed of metal cords 47 oriented parallel with respect to one another and held between two layers 48, 49 of rubber mixture, referred to as calendaring layers. Cotton threads 40 are deployed on the "outer" surface (surface which is not in contact with the metal cords) of the calendaring layer 49, which cotton threads form an angle 41 with the direction of the metal cords 47 equal to 35°. In accordance with the invention, the angle formed by the cotton threads 40 with the direction of the metal cords 47 is greater than 10°.

The ratio of the spacing 42 between two textile threads, measured along a direction parallel to the direction of the metal cords 47 of the carcass reinforcement layer 42 to the spacing 43 between the reinforcing elements of the carcass reinforcement layer 42, measured along a direction perpendicular to the direction of the said reinforcing elements of the carcass reinforcement layer 42, is equal to 22 and thus greater than 10 in accordance with the invention.

As in the case of FIGS. 2 and 3, the cotton threads 40 are deployed on the surface of the carcass reinforcement layer 42 which comes into contact with the bead wire 4.

In the three embodiments illustrated in FIGS. 2, 3 and 4, the cotton threads 20, 30 and 40 exhibit a diameter equal to 0.23 mm.

The cotton threads 20, 30 and 40 exhibit, in the "permeability" test, measured as described above, a flow rate equal to 2 cm³/min and thus between 1 and 3 cm³/min in accordance with the invention.

Figure 5:
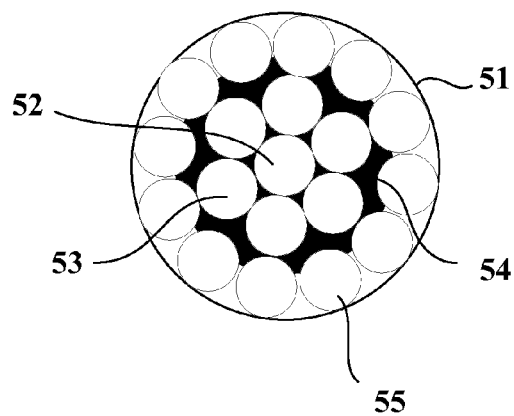

FIG. 5 illustrates a diagrammatic representation of the cross-section of a carcass reinforcement cord 51 of the tire 1 of FIG. 1. This cord 51 is a non-wrapped layered cord of 1+6+12 structure, composed of a central nucleus formed of a thread 52, of an intermediate layer formed of six threads 53 and of an outer layer formed of twelve threads 55.

It exhibits the following characteristics (d and p in mm):
1+6+12 structure;
$d_1$=0.20 (mm);
$d_2$=0.18 (mm);
$p_2$=10 (mm);
$d_3$=0.18 (mm);
$p_3$=10 (mm);
$(d_2/d_3)$=1;

with $d_2$ and $p_2$ respectively the diameter and the helical pitch of the intermediate layer and $d_3$ and $p_3$ respectively the diameter and the helical pitch of the threads of the outer layer.

The core of the cord, composed of the central nucleus formed of the thread 52 and of the intermediate layer formed of the six threads 53, is sheathed with a rubber composition 54 based on non-vulcanized diene elastomer (in the raw state). The sheathing is obtained via a head for extrusion of the core composed of the thread 52 surrounded by the six threads 53, followed by a final operation in which the 12 threads 55 are twisted or cabled around the core thus sheathed.

The aptitude for penetration of the cord 51, measured according to the method described above, is equal to 95%.

The elastomeric composition constituting the rubber sheath 54 is produced from a composition as described above and exhibits, in the present case, the same formulation, based on natural rubber and on carbon black, as that of the calendaring layers 28;29, 38;39 and 48;49 of the carcass reinforcement which the cords are intended to reinforce.

Figure 6:
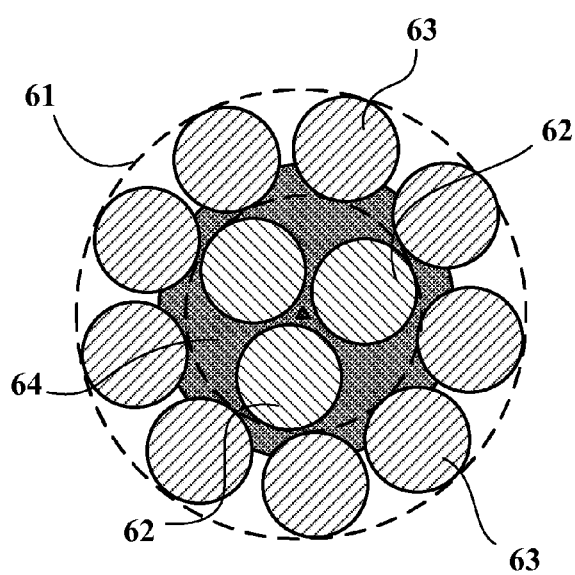

FIG. 6 illustrates a diagrammatic representation of the cross-section of another carcass reinforcement cord 61 which can be used in a tire according to the invention. This cord 41 is a non-wrapped layered cord of 3+9 structure, composed of a central core formed of a cord composed of three threads 62 twisted around one another and of an outer layer formed of nine threads 63.

It exhibits the following characteristics (d and p in mm):
3+9 structure;
$d_1$=0.18 (mm);
$p_1$=5 (mm);
$(d_1/d_2)$=1;
$d_2$=0.18 (mm);
$p_2$=10 (mm);

with $d_1$ and $p_1$ respectively the diameter and the helical pitch of the threads of the central core and $d_2$ and $p_2$ respectively the diameter and the helical pitch of the threads of the outer layer.

The central core composed of a cord formed of the three threads 62 was sheathed with a rubber composition 64 based on non-vulcanized diene elastomer (in the raw state). The sheathing is obtained via a head for extrusion of the cord 62, followed by a final operation in which the 9 threads 63 are cabled around the core thus sheathed.

The aptitude for penetration of the cord 61, measured according to the method described above, is equal to 95%.

Figure 7:
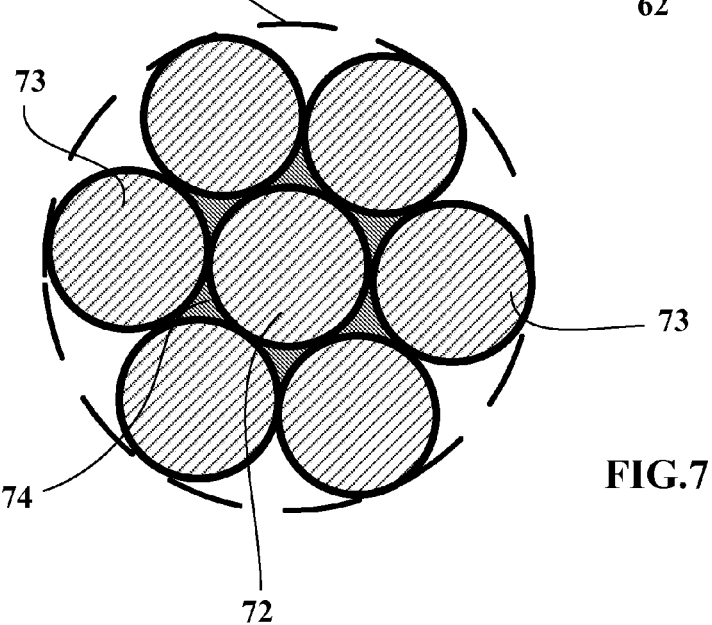

FIG. 7 illustrates a diagrammatic representation of the cross-section of another carcass reinforcement cord 71 which can be used in a tire according to the invention. This cord 71 is a non-wrapped layered cord of 1+6 structure, composed of a central nucleus formed of a thread 72 and of an outer layer formed of six threads 73.

It exhibits the following characteristics (d and p in mm):
1+6 structure;
$d_1$=0.200 (mm);
$(d_1/d_2)$=1.14;
$d_2$=0.175 (mm);
$p_2$=10 (mm);

with $d_1$ the diameter of the nucleus and $d_2$ and $p_2$ respectively the diameter and the helical pitch of the threads of the outer layer.

The central nucleus composed of the thread 72 was sheathed with a rubber composition 74 based on non-vulcanized diene elastomer (in the raw state). The sheathing is obtained via a head for extrusion of the thread 72, followed by a final operation in which the 6 threads 73 are cabled around the nucleus thus sheathed.

The aptitude for penetration of the cord 71, measured according to the method described above, is equal to 95%.

Tests were carried out with tires produced according to the invention in accordance with the representation of FIGS. 1, 2 and 5, and others with two types of "reference" tires.

The first reference tires R1 differ from the tires according to the invention by cords 51 of the carcass reinforcement not comprising the sheathing layer 54 and not comprising cotton threads on the surface of the carcass reinforcement layer.

The second reference tires R2 differ from the tires according to the invention by the presence of cotton threads on the surface of the carcass reinforcement layer exhibiting diameters equal to 0.37 mm and exhibiting, in the "permeability" test, measured as described above, a flow rate equal to 4.2 cm³/min.

Rolling drum endurance tests were carried out on a test machine which applies a load of 4415 daN and a speed of 40 km/h on the tires, with oxygen-doped inflation of the tires.

The tests were carried out for the tires according to the invention with conditions identical to those applied to the reference tires. The running operations are halted as soon as the tires exhibit damage to the carcass reinforcement.

The tests thus carried out showed that the distances travelled with the reference tires R2 and the tires according to the invention are equivalent and total 300 000 km, whereas the reference tires R1 travelled only 250 000 km.

Other rolling endurance tests on a vehicle driving axle were carried out by applying a load of 3680 daN and a speed of 40 km/h on the tires, with an inflation of the tires of 0.2 bar. The tests were carried out for the tires according to the invention with conditions identical to those applied to the reference tires. The running operations are carried out over a distance of 12 000 km or are halted as soon as the tires exhibit damage to the carcass reinforcement.

The tests thus carried out showed that the distances travelled during each of these tests with the reference tires R2 and the tires according to the invention always made it possible to reach the 12 000 km, whereas the reference tires R1 travelled at most only 10 000 km.

These first two tests, representative of conditions of use of the tires, demonstrate that the presence of the cords 51 of the carcass reinforcement comprising a sheathing layer 54 in combination with cotton threads present on the surface of the carcass reinforcement layer result in an improvement in the endurance of the tires.

A third test, corresponding to severe conditions of use of the tires, was carried out. These tests are also carried out with the tires according to the invention and the reference tires R2. After a preliminary phase of stoving lasting twelve 12 weeks under a pure oxygen atmosphere, the tires are run on a rolling drum under conditions of load 20% greater than the nominal load and of inflation 20% greater than the nominal pressure.

The tests thus carried out showed that the distances travelled during this test with the reference tires R2 are 15% less than those obtained with the tires according to the invention.

These results demonstrate that the decrease in the flow rate measured according to the "permeability" test of the cotton threads deployed on the surface of the carcass reinforcement layer makes it possible to regain a performance in terms of endurance which is similar to that of the normal tires, in particular under particularly severe running conditions.

The invention claimed is:

1. A tire comprising:
   a radial carcass reinforcement comprising at least one layer of metal reinforcing elements wherein the metal reinforcing elements of at least one layer of the radial carcass reinforcement are cords exhibiting, in a "permeability" test, a flow rate of less than 20 cm$^3$/min, and wherein at least one layer of the radial carcass reinforcement is provided, on at least one face, with textile threads exhibiting, in the "permeability" test, a flow rate no less than 1 cm$^3$/min and no greater than 3 cm$^3$/min;
   a crown reinforcement; and
   a tread radially topping the crown reinforcement and joined to two beads via two sidewalls.

2. The tire according to claim 1, wherein the metal reinforcing elements of at least one layer of the carcass reinforcement are cords comprising at least two layers, and wherein at least one inner layer is sheathed with a layer consisting of a polymer composition.

3. The tire according to claim 1, wherein the metal reinforcing elements of at least one layer of the carcass reinforcement exhibit, in the "permeability" test, a flow rate of less than 10 cm$^3$/min.

4. The tire according to claim 1, wherein the textile threads exhibit a diameter of between 0.2 and 0.35 mm.

5. The tire according to claim 1, wherein the textile threads exhibiting, in the "permeability" test, a flow rate no less than 1 cm$^3$/min and no greater than 3 cm$^3$/min are parallel to one another and oriented along a direction parallel to that of the metal reinforcing elements of the at least one layer of the carcass reinforcement.

6. The tire according to claim 1, wherein the textile threads exhibiting, in the "permeability" test, a flow rate no less than 1 cm$^3$/min and no greater than 3 cm$^3$/min are oriented mainly along a direction parallel to that of the metal reinforcing elements of the at least one layer of the carcass reinforcement and wherein the said textile threads are undulating around this main direction.

7. The tire according to claim 1, wherein the textile threads exhibiting, in the "permeability" test, a flow rate no less than 1 cm$^3$/min and no greater than 3 cm$^3$/min are oriented mainly along a straight direction and wherein the textile threads form an angle with the direction of the metal reinforcing elements of the said at least one layer of the carcass reinforcement which is greater than 10°.

8. The tire according to claim 1, wherein the metal reinforcing elements of at least one layer of the carcass reinforcement are layered metal cords of [L+M] or [L+M+N] construction which can be used as reinforcing element of a tire carcass reinforcement, comprising a first layer C1 having L threads of diameter $d_1$ with L ranging from 1 to 4, surrounded by at least one intermediate layer C2 having M threads of diameter $d_2$ wound together in a helix according to a pitch $p_2$ with M ranging from 3 to 12, the layer C2 optionally being surrounded by an outer layer C3 of N threads of diameter $d_3$ wound together in a helix according to a pitch $p_3$ with N ranging from 8 to 20, and wherein a sheath composed of a crosslinkable or crosslinked rubber composition based on at least one diene elastomer covers, in the construction [L+M], the first layer C1 and, in the construction [L+M+N], at least the layer C2.

9. The tire according to claim 8, wherein the diameter of the threads of the first layer (C1) is between 0.10 and 0.5 mm and wherein the diameter of the threads of the layers (C2, C3) is between 0.10 and 0.5 mm.

10. The tire according to claim 1, wherein the crown reinforcement is formed of at least two working crown layers of inextensible reinforcing elements, crossed from one layer to the other, forming, with the circumferential direction, angles of between 10° and 45°.

11. The tire according to claim 1, wherein the crown reinforcement further comprises at least one layer of circumferential reinforcing elements.

12. The tire according to claim 1, wherein the crown reinforcement is supplemented radially on the outside by at least one additional ply, known as protective ply, of elastic reinforcing elements, which are oriented, with respect to the circumferential direction, with an angle of between 10° and 45° and in the same direction as the angle formed by the inextensible elements of the working ply radially adjacent to it.

13. The tire according to claim 1, wherein the crown reinforcement additionally comprises a triangulation layer formed of metal reinforcing elements forming, with the circumferential direction, angles greater than 60°.

14. A tire comprising:
a carcass reinforcement comprising at least one layer of metal reinforcing elements, wherein the metal reinforcing elements of at least one layer of the carcass reinforcement are cords comprising at least two layers, at least one inner layer being sheathed with a layer consisting of a polymeric composition, and wherein at least one layer of the carcass reinforcement is provided, on at least one face, with textile threads exhibiting, in a "permeability" test, a flow rate no less than 1 cm$^3$/min and no greater than 3 cm$^3$/min;
a crown reinforcement; and
a tread radially topping the crown reinforcement and joined to two beads via two sidewalls.

15. The tire according to claim 14, wherein the textile threads exhibit a diameter of between 0.2 and 0.35 mm.

16. The tire according to claim 14, wherein the textile threads exhibiting, in the "permeability" test, a flow rate no less than 1 cm$^3$/min and no greater than 3 cm$^3$/min are parallel to one another and oriented along a direction parallel to that of the metal reinforcing elements of the at least one layer of the carcass reinforcement.

17. The tire according to claim 14, wherein the textile threads exhibiting, in the "permeability" test, a flow rate no less than 1 cm$^3$/min and no greater than 3 cm$^3$/min are oriented mainly along a direction parallel to that of the metal reinforcing elements of the at least one layer of the carcass reinforcement and wherein the said textile threads are undulating around this main direction.

18. The tire according to claim 14, wherein the textile threads exhibiting, in the "permeability" test, a flow rate no less than 1 cm$^3$/min and no greater than 3 cm$^3$/min are oriented mainly along a straight direction and wherein the textile threads form an angle with the direction of the metal reinforcing elements of the said at least one layer of the carcass reinforcement which is greater than 10°.

19. The tire according to claim 14, wherein the crown reinforcement is formed of at least two working crown layers of inextensible reinforcing elements, crossed from one layer to the other, forming, with the circumferential direction, angles of between 10° and 45°.

20. The tire according to claim 14, wherein the crown reinforcement further comprises at least one layer of circumferential reinforcing elements.

21. The tire according to claim 14, wherein the crown reinforcement is supplemented radially on the outside by at least one additional ply, known as protective ply, of elastic reinforcing elements, which are oriented, with respect to the circumferential direction, with an angle of between 10° and 45° and in the same direction as the angle formed by the inextensible elements of the working ply radially adjacent to it.

22. The tire according to claim 14, wherein the crown reinforcement additionally comprises a triangulation layer formed of metal reinforcing elements forming, with the circumferential direction, angles greater than 60°.

* * * * *